(12) United States Patent
Mills et al.

(10) Patent No.: US 7,203,177 B2
(45) Date of Patent: Apr. 10, 2007

(54) BANDWIDTH EFFICIENT CONFERENCING SYSTEM WITH DISTRIBUTED PROCESSING

(75) Inventors: William Mills, Columbia, MD (US); Zoran Mladenovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1069 days.

(21) Appl. No.: 09/992,008

(22) Filed: Nov. 26, 2001

(65) Prior Publication Data

US 2002/0167915 A1    Nov. 14, 2002

Related U.S. Application Data

(60) Provisional application No. 60/279,676, filed on Mar. 30, 2001.

(51) Int. Cl.
*H04L 12/16* (2006.01)
(52) U.S. Cl. .................. 370/261; 370/263; 370/270; 370/271
(58) Field of Classification Search ......... 370/260–271
See application file for complete search history.

(56) References Cited

U.S. PATENT DOCUMENTS 4,499,578 A    2/1985    Marouf et al.
4,757,493 A    7/1988    Yuen et al.
5,495,522 A *  2/1996    Allen et al. ............ 379/202.01

* cited by examiner

*Primary Examiner*—John Pezzlo
*Assistant Examiner*—Inder Pal Mehra
(74) *Attorney, Agent, or Firm*—Steven A. Shaw; W. James Brady; Frederick J. Telecky, Jr.

(57) ABSTRACT

A distributed intelligence conferencing system is disclosed, having a plurality of conferencing nodes to connect groups of participants to a conference. Each of the conferencing nodes provides for the connection of one or more participants to the conference. Each node includes a DSP for distributed signal processing, eliminating the need for a central processor. The node DSP has a signal measuring device for measuring a significant characteristic of the signals from each of the participants, such as power; a processing device, interconnected with the signal measuring device, for determining the relative characteristics, such as power levels, of each of the number of participant input signals; a communication device, interconnected with the processing device, for communicating the measured signal characteristics for a plurality of participant input signals to all other conferencing nodes; muting means for muting individual participant input signals so that only selected signals are transmitted over the conference bus to the other participants.

20 Claims, 5 Drawing Sheets

FIG. 2
(PRIOR ART)

| | BITS | |
|---|---|---|
| | 15      8 | 7      0 |
| PARTICIPANT 1 | SAMPLE 2 | SAMPLE 1 |
| | SAMPLE 4 | SAMPLE 3 |
| PARTICIPANT 2 | SAMPLE 2 | SAMPLE 1 |
| | SAMPLE 4 | SAMPLE 3 |
| PARTICIPANT 3 | SAMPLE 2 | SAMPLE 1 |
| | SAMPLE 4 | SAMPLE 3 |
| PARTICIPANT 4 | SAMPLE 2 | SAMPLE 1 |
| | SAMPLE 4 | SAMPLE 3 |
| PARTICIPANT 5 | SAMPLE 2 | SAMPLE 1 |
| | SAMPLE 4 | SAMPLE 3 |
| ⋮ | | |
| GROUP n | SAMPLE 2 | SAMPLE 1 |
| | SAMPLE 4 | SAMPLE 3 |

BANDWIDTH EFFICIENT CONFERENCING SYSTEM WITH DISTRIBUTED PROCESSING

CROSS REFERENCE TO RELATED APPLICATIONS

This application claims the benefit of provisional application No. 60/279,676 filed Mar. 30, 2001.

FIELD OF THE INVENTION

The invention relates to telephony conferencing. More specifically, a distributed intelligence conferencing system is disclosed that greatly reduces the communication resources required to support a telephony conference.

BACKGROUND OF THE INVENTION

FIG. 1 illustrates a representative prior art digital telephony conferencing system. The conferencing system consists of numerous participants at locations 1 through n. One of more telephones 5 may be located at each location. A multiplexing and demultiplexing device 4 connects each of the telephones to the conference bus 3. Some locations may have only a single user, while other locations may have multiple users. Each user will be individually connected through a multiplexer 4. A time-division multiplexing (TDM) bus 3 conveys the signal information generated by each participant to all other participants of the system.

FIG. 2 illustrates a representative frame of the information communicated by the TDM bus 3 during one frame period, τ. In the exemplary embodiment, the frame period, τ, is 0.5 msec and four eight-bit digitized and encoded samples, illustrated as sample 1 through sample 4 are required to adequately represent the signal information communicated by one participant in this period of time. The four samples from each participant are sequentially grouped together within the TDM frame to form a TDM time slot. For a number of participant groups, group 1 through group n, the total number of payload bytes the TDM frame must support is given by the equation:

$$T_{bytes} = (4 \text{ bytes/participant}) * (n \text{ participants}).$$

For 30 participants the system requires 30 TDM time slots every 0.5 ms and a total of 120 bytes of information in a frame.

Although the specific parameters, such as frame period or sample size, of an exemplary conference can vary, the size of the data payload will be dependant upon these factors and upon the number of participants.

When a large number of people participate in a telephony conference, there is a significant likelihood that two or more participants will speak at the same time. It is also likely that background noise originating at one or more group nodes will be transmitted through the conferencing system. The transmitted signals of the background noise and multiple speakers interfere with the signal that is of interest to the conference participants. These interfering signals impair the ability of the conference listeners to hear and understand the speaker that is of interest to them and thereby reduce the quality of the communication.

Further, the transmission of background noise, as well as the transmission of other speakers in addition to the primary speaker places an additional load on a communications system.

To overcome these problems, some conferencing systems limit the number of signals that may be heard by the conference participants. This is accomplished by muting all but the loudest signals originating at the telephones of participants in the conference. Typically, a system may limit transmission to three separate signals of three speakers who are talking simultaneously from among a large number of participants. The remaining signals which were transmitted to the central processor will be muted and therefore not provided to the remaining participants.

In order to determine which of the participants are the loudest, a central processor 6 for the system must receive all of the input signals from each of the participants and perform a comparison. Transmission of all input to a central DSP requires significant bandwidth, especially if there are a number of participants. Further, processing of all signals for strength comparison can require significant processing resources. The use of a single control DSP 6 will require significant processing resources in a single DSP and can cause delay.

SUMMARY OF THE INVENTION

The present invention eliminates the unnecessary use of communication resources to support the communication of signals that will ultimately be muted and reduces the processing demands a primary processor of a conferencing system, by employing a distributed intelligence architecture among digital signal processors (DSPs) at the nodes which form a conferencing system, and eliminating the need for a central processor.

A distributed intelligence conferencing system, as illustrated in FIG. 3, is disclosed, having a plurality of conferencing nodes 12 connected to a communication bus 11. Each of the conferencing nodes can connect one or more participants to the conference and has: a power measuring device for measuring the power on each of a number of participant input signals; a processing device, interconnected with the power measuring device, for determining the relative power levels of each of the number of participant input signals; and a communication device, interconnected with the processing device, for communicating the measured power for a plurality of participant input signals to the other conferencing nodes.

Each node 12 of the system measures the power level of each of the conference participants connected to that node. The processor in the node identifies the strongest signals. The three strongest signals are identified in the exemplary embodiment, however, a greater or lesser number may be identified depending on the implementation of the present invention. Each node 12 provides the signal strength value and signal sample of its three strongest signals to the other nodes through the bus 11. The nodes then compare each of the three strongest local signals to the strength of the received signals and determines if the local signals should be included in the conferencing group signal provided to the participants in the conference.

The present invention can also include: a gain control device interconnected with the processing device, for individually controlling a gain applied to each of the number of participant input signals, after the power measuring device has measured the power on the number of participant input signals; and a summing device for summing the number of participant input signals, after the gain control has been applied to the number of participant input signals.

BRIEF DESCRIPTION OF THE DRAWINGS

Exemplary embodiments of the present invention are discussed with reference to the following drawings:

FIG. 2 illustrates a representative frame of the information communicated by the TDM bus of FIG. 1 during one frame period, $\tau$;

DETAILED DESCRIPTION OF THE INVENTION

Figure 1:
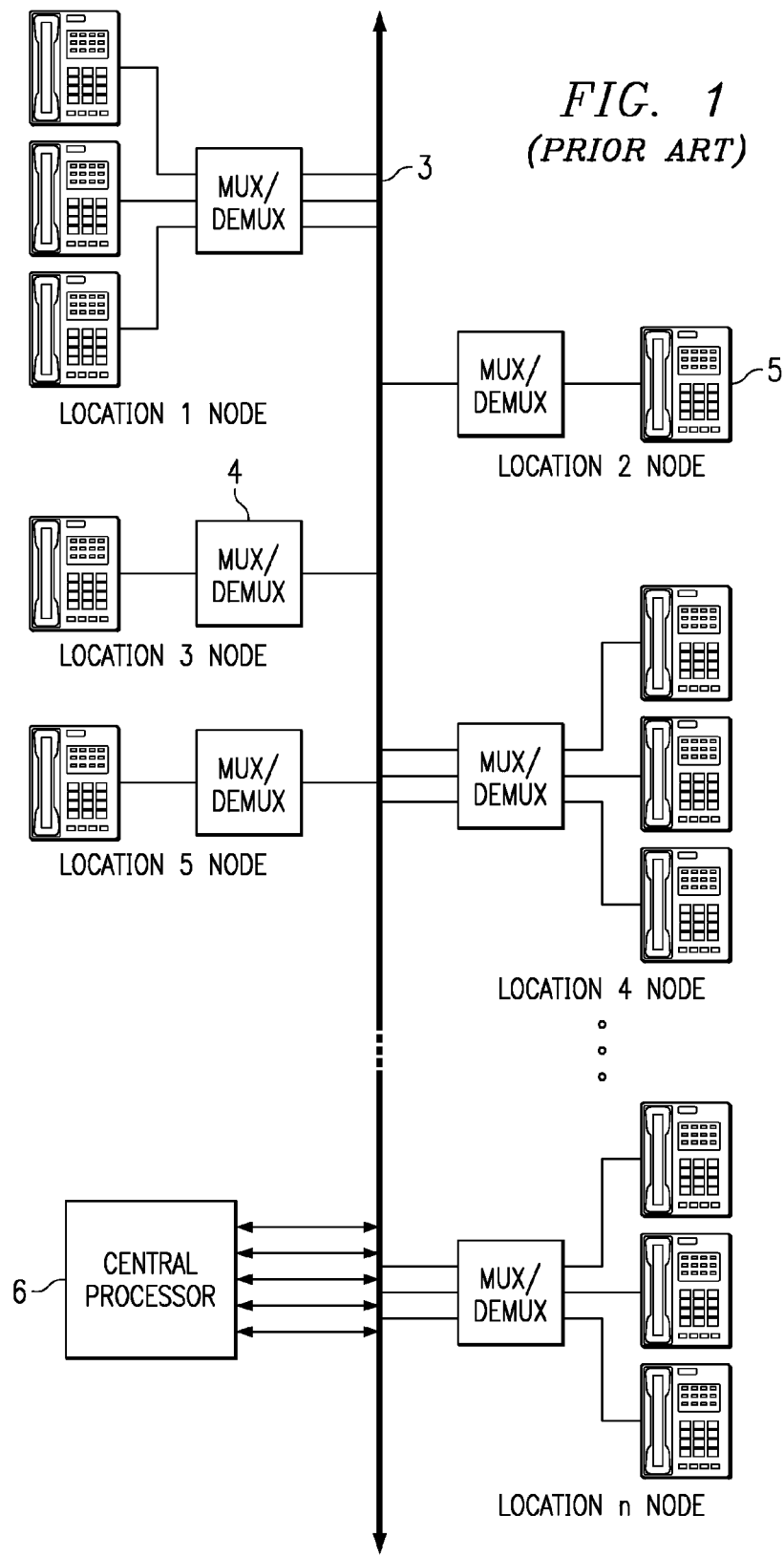
FIG. 1—is a block diagram illustrating a representative prior art digital telephony conferencing system.
Figure 3:
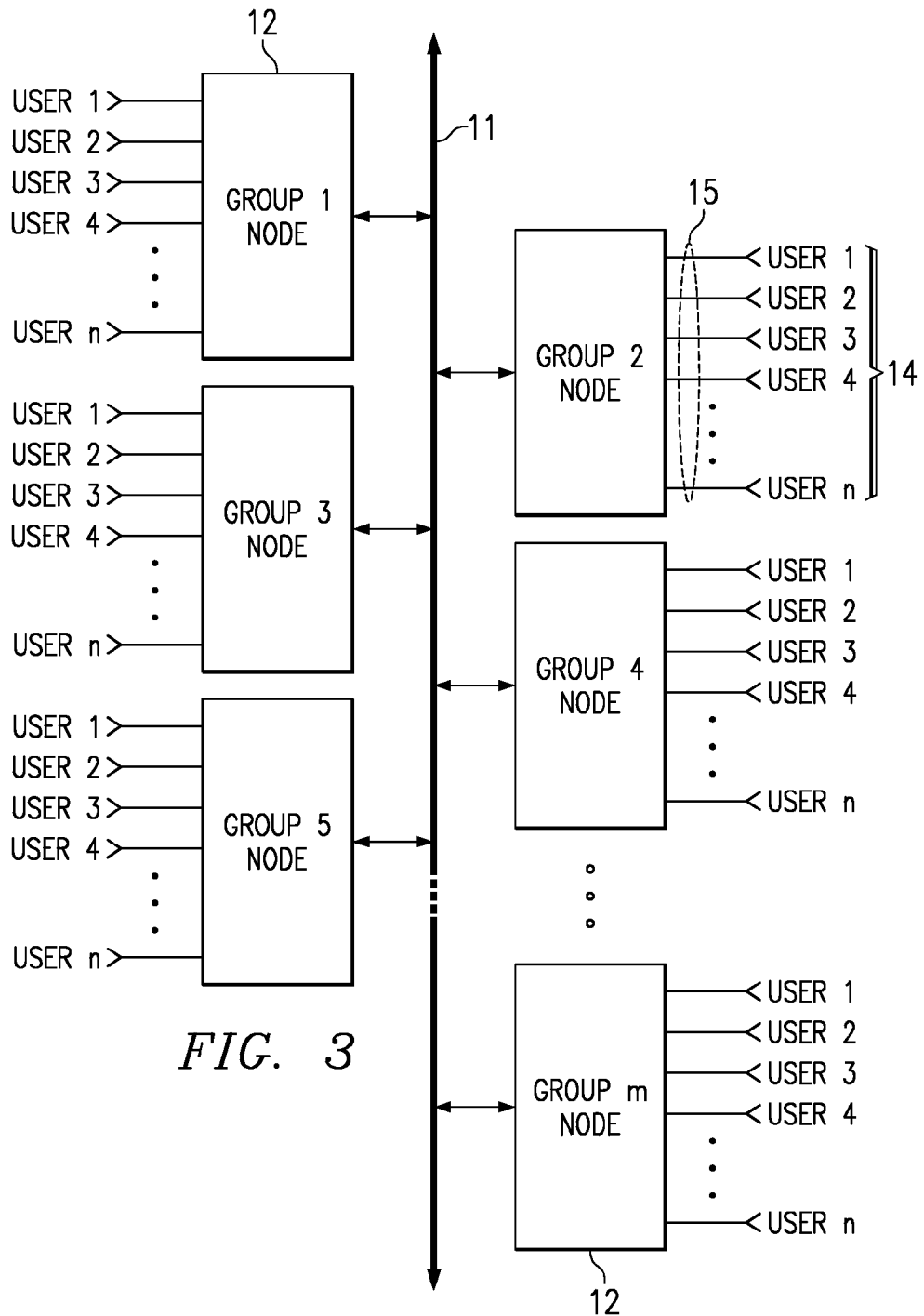
FIG. 3 is a block diagram illustrating a representative conferencing system of the present invention.
Figure 5:
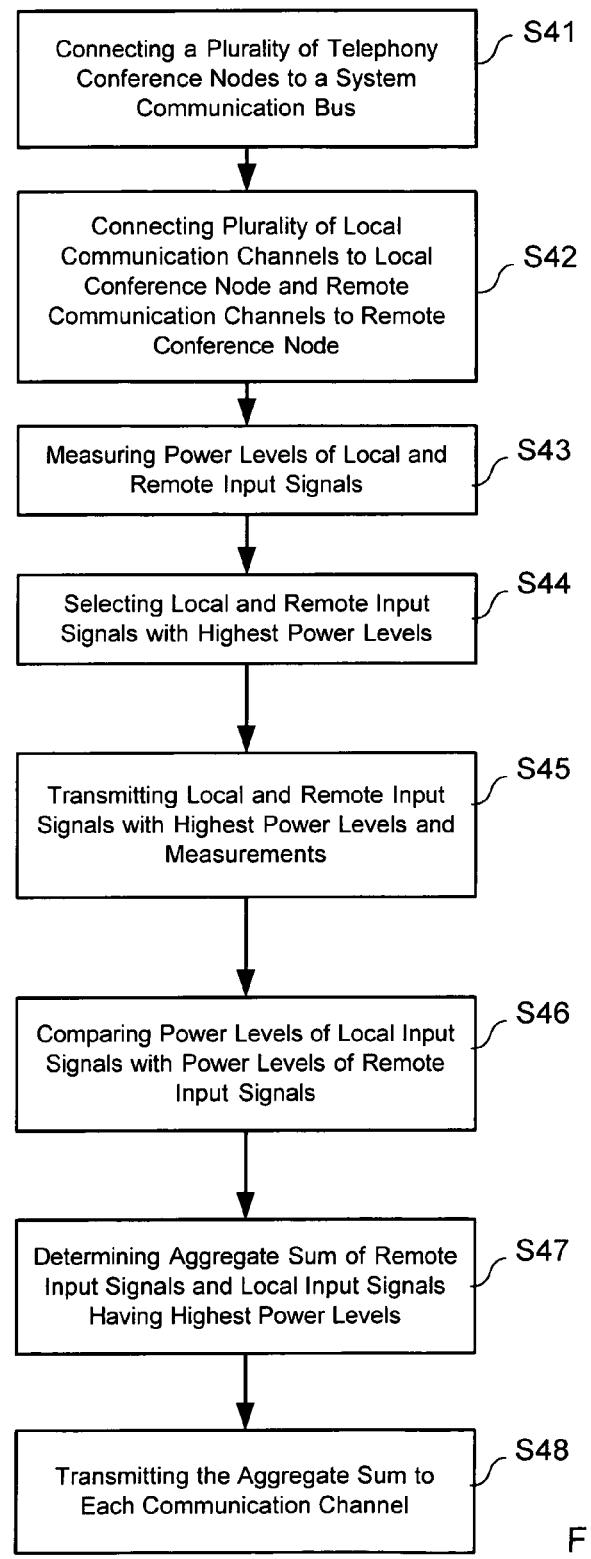
FIG. 5 is a flowchart of a method for transmitting communication signals in a telephony conference system.

FIG. 3 illustrates a representative conferencing system of the present invention. Further, FIG. 5 illustrates steps of a method for transmitting communication signals in a telephony conference system of the present invention. The conferencing system contains a number of conferencing nodes 12 identified by their respective group numbers group 1 through group n. Each node 12 is capable of providing conferencing support to multiple participants or users 14 that are connected to the node 12 by separate communication channels 15. Communication between the multiple nodes 12 is accomplished with a TDM bus 11 (S41).

Figure 4:
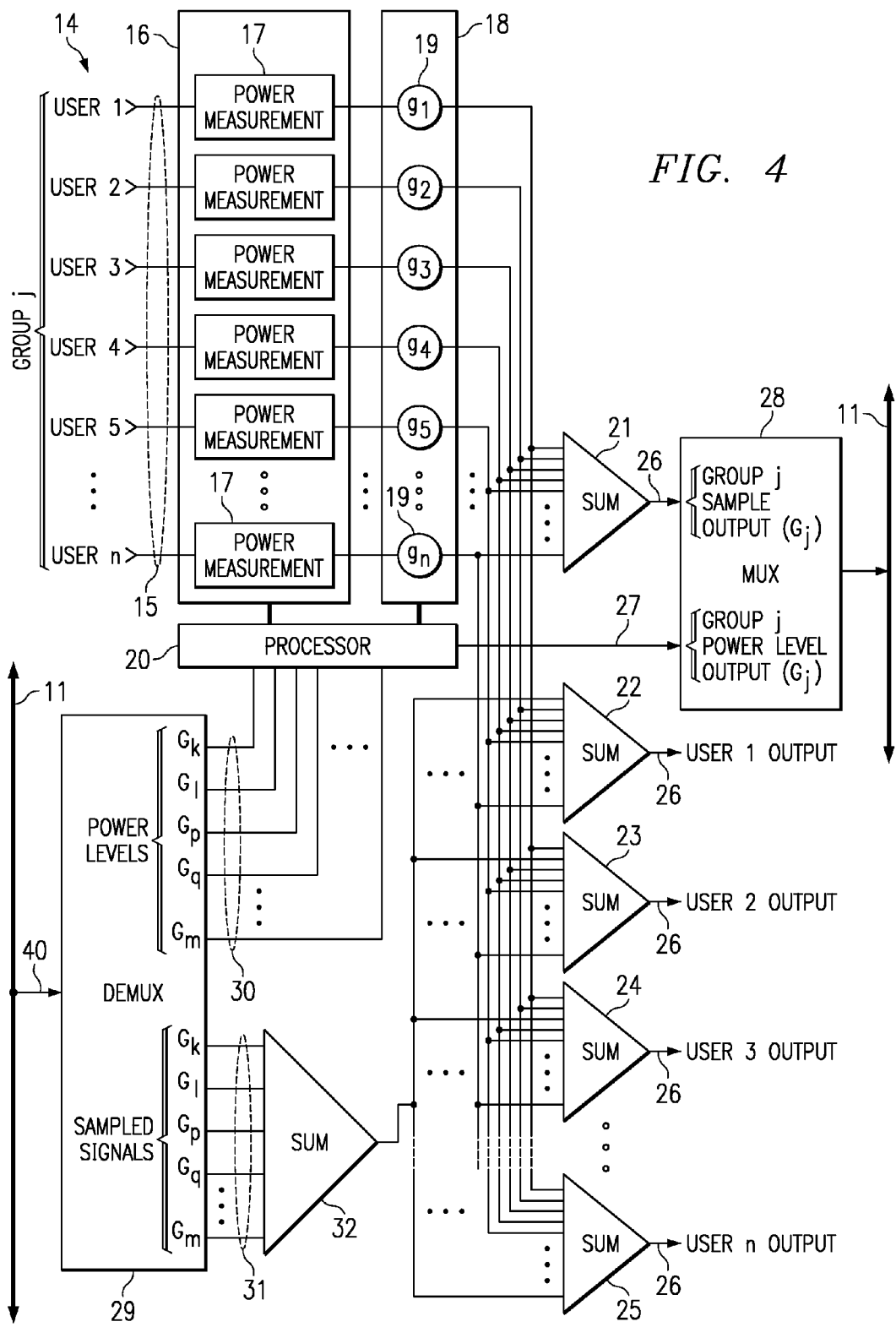
FIG. 4 is a block diagram illustrating a representative structure of a conferencing node of FIG. 3 in greater detail.

FIG. 4 illustrates a representative structure of a conferencing node 12 in greater detail. A number, n, of separate participants or users 14 are connected to this node 12j by communication channels 15 (S42). In an exemplary embodiment of the invention, node 12j is comprised of a DSP that is capable of supporting ten communication channels 15, each DSP may provide communication to one or more participants. In the exemplary embodiment a power measuring module 16 of the DSP, having ten power measurement devices 17, measures the power S43 of the signal received on each communication channel 15 during some portion of the frame period, $\tau$. In a preferred embodiment, the power measurements are periodically obtained during each 0.5 msec frame period. The power measuring module 16 could have more or less than ten separate devices 17 provided that the device was able to measure each individual channel.

The measured power information from each of the power measurement modules 17 is provided to a processor 20. The present invention recognizes that the power level and signal from the individual participants may require signal processing, such as commonly applied to remove distortion or hystorisis. The reference to power level includes signal processing. Processor 20 compares all of the power levels of each of the users 15 provided to processor 20 from module 16 that were measured during frame period $\tau$ and identifies the three signals having the greatest power level. Although the preferred embodiment of the invention identifies the three strongest signals S44, a different number of the strongest signals may be identified depending upon the specific implementation of the present invention. The three strongest signals will identify the active speakers for the next sequential frame period. All signals other than the three strongest signals will be muted by the gain module 18 in the next sequential frame period. This information will not be placed on the conference TDM bus 11, so that the conference listeners, including those in the current node, will not hear these signals.

Processor 20 also receives measured power information pertaining to other groups of conference participants S44 that are connected to other conference nodes of the system. This information is provided S45 to processor 20 through the bus lines 30 connecting it to a demultiplexer 29. The strength of signals from other nodes is used to compare S46 with the strength measurements of the signals from the node 12j to determine which if any of the signals from the participants connected to node 12j will be transmitted to the system bus 11.

In the exemplary embodiment illustrated, the set of frame periods occurring during a conference can be identified by the set $\{\tau_0, \tau_1, \tau_2, \ldots, \tau_f\}$, where the sequence of each frame period is identified by its respective position within the set. For the initial frame period $\tau_0$, the processor 20 has no information regarding the relative power levels of the participant signals during a prior frame period, since no frame precedes the initial frame. Therefore, the $j^{th}$ processor 20 applies a default gain value to each participant signal connected to the $j^{th}$ node for the frame period $\tau_0$. The power measurements taken during frame period $\tau_0$ are used to establish the gain settings applied by the processor during frame period $\tau_1$, and so forth. Generally stated, the power measurements taken during frame period $\tau_i$ are used to establish the gain settings applied by the processor during frame period $\tau_{i+1}$, for all integer values of i.

Once the $j^{th}$ processor 20 has identified the three strongest participant signals, it determines whether any of these signals are provided directly to the $j^{th}$ node 12. If so, the $j^{th}$ processor 20 sets the gain device 19 associated with the particular signal to a non-zero value for the frame period following the frame period in which the power measurement is made. The gain settings for all participant signals connected to the $j^{th}$ node, other than the three most powerful signals, are set to zero or some similar value to mute these signals. In a preferred embodiment of the invention, the non-zero gain settings have values in the range $0 < g_i \leq 1$. After the individual gains are applied to the participant signals, each signal is provided to the input of combiner 21. The participant signals provided to the combiner 21 are expressed by the equation:

$$GR_{j,i} = g_{ni} * S_{in,i}$$

where, $g_{ni}$ = the gain applied by the $i^{th}$ gain device 19; and $S_{in,i}$ = the $i^{th}$ participant signal provided to the $j^{th}$ node 12.

Combiner 21 combines the gain-modified participant signals to generate a sum 26 of the combined signals S47 that may be expressed by the equation: Combiner 21 combines the gain-modified participant signals to generate a sum 26 of the combined signals S47 that may be expressed by the equation:

$$GR_j = \sum_{i=1}^{N} GR_{j,i} = \sum_{i=1}^{N} g_{ni} \cdot S_{in,i}$$

The summed signal 26 is provided to multiplexer 28. In the exemplary embodiment, a 0.5 ms frame period is illustrated. Four discrete gain-modified signal sums 26 are provided by combiner 21 to the multiplexer every frame period. Each discrete signal sum 26 is preferably expressed in a digital format that represents the sum of the participant signal sums. Processor 20 sends the multiplexer 28 power level information 27 pertaining to the three most powerful participant signals measured by the j$^{th}$ node. Multiplexer 28 combines the power level information 27 and the four sample sums 26 into a time-slot data packet.

With the same 0.5 ms frame size and the same sampling rate, a data frame for the TDM information conveyed by the TDM bus 11 of the present invention need only contain only six time slots for a system with thirty participants distributed among three groups with ten participants per group. Each group or node in the system conveys S48 its information interleaved with the other groups. Each time slot preferably contains eight bytes of information. Four data bytes are dedicated to conveying the four discrete sample sums 26, three data bytes convey the power information for the three strongest signals measured by the j$^{th}$ node 12, and one data byte conveys a synchronization byte.

Demultiplexer 29 receives the TDM frame 40 from the TDM bus 11 and demultiplexes the power level information and sampled signal sums provided by the other nodes 12. The power level information is provided to processor 20 on data lines 30 and the sampled signal sums are provided to combiner 32 on data lines 31. Combiner 32 sums all of the sampled signal sums from the other nodes 12 and provides this sum to an input of each of the combiners 22–25. Combiners 22–25 each sum together the aggregate of all gain-modified participant signals, except for one, provided to any node 12 of the system 10. For example, combiner 22 provides the aggregate sum of all participant signals to participant number one's telephone speaker, except for the input signal generated by participant number one. Combiner 23 provides the aggregate sum of all participant signals to participant number two's telephone speaker, except for the input signal generated by participant number two. Similarly, combiner 25 provides the aggregate sum of all participant signals to participant number n's telephone speaker, except for the input signal generated by participant number n. A participant does not receive his or her own signal, just as one does not receive his or her own signal in the telephone speaker for any other type of telephone call. The summed signal received by each participant k can be expressed by the equation:

$$R_i = \sum_{j=1}^{m} (GR_j) - (g_{nk} \cdot S_{in\,k}) =$$

$$\sum_{j=1}^{m} \left( \sum_{i=1}^{N} (GR_{j,i}) \right) - (g_{nk} \cdot S_{in,k}) = \sum_{j=1}^{m} \left( \sum_{i=1}^{N} (g_m \cdot S_{in,i}) \right) - (g_{nk} \cdot S_{in,k})$$

where, m=the number of nodes;

N=the number of users at the m$^{th}$ node; and k=the participant of interest.

The present invention reduces the bandwidth required to support a large number of conference participants by reducing the signals provided to the system bus 11. Each node separately pre-screens the signals of the local participants, reducing the number of samples transported by the communications system. Further, the comparison of signal strength is distributed throughout the system and performed at each node, reducing the processing at the system control. Because each node need only process three local signals and three signals from remote nodes, the total system processing bandwidth resources needed to support a conference call is distributed, can be conduced in parallel, and is reduced.

Because many varying and different embodiments may be made within the scope of the inventive concept herein taught, and because many modifications may be made in the embodiments herein detailed in accordance with the descriptive requirements of the law it is to be understood that the details herein are to be interpreted as illustrative and not in a limiting sense.

What is claimed is:

1. A distributed conferencing system, comprising:
   a system communication bus;
   a plurality of conferencing nodes connected to said system communication bus, each of a local node in relation to a plurality of remote nodes, comprising:
      a plurality of power measuring devices for measuring a characteristic of each of a number of local participant input signals;
      a processor, connected with said power measuring devices, for distinguishing a number of strongest signals within said local participant input signals by comparison of said measured characteristic;
      a multiplexer, connected with said processor and said system communication bus, for communicating said measured characteristic of each of said strongest local participant input signals, to said plurality of remote conferencing nodes; and
      a demultiplexer, connected with said processor and said system communication bus, for receiving said measured characteristic of each of said significant signals of remote participant input signals from said plurality of conferencing nodes;
   wherein said processor compares said measured characteristic of each of said strongest signals of said local participant input signals and said strongest remote participant input signals.

2. The distributed conferencing system according to claim 1, wherein said measured characteristic is a power level of said local and said remote participant input signals.

3. The distributed conferencing system according to claim 2, wherein said processor distinguishes the strongest local participant input signals by determining the highest power levels from the power levels measured from the local participant input signals.

4. The distributed conferencing system according to claim 2, each of said nodes further comprising:
   a gain control module, interconnected with said processor and said power measuring devices, for individually controlling a gain applied to each of said number of local participant input signals, after said power measuring devices have measured the power on said number of local participant input signals; and
   a combiner, interconnected with said processor and said multiplexer, for summing said number of local participant input signals, after said gain has been applied to said number of local participant input signals.

5. The distributed conferencing system of claim 4, wherein said gain control module mutes the contribution of each of the number of local conference participant's own input signal, within said combined number of local participant input signals.

6. The distributed conferencing system of claim 4, wherein, at each of said plurality of conferencing nodes, said processor identifies a number, N, of said strongest signals among said local participant signals.

7. The distributed conferencing system of claim 6, wherein, at each of said plurality of conferencing nodes, said processor identities a number, N, of said strongest signals among said local participant signals and a set of additional strongest signals communicated from said plurality of remote conferencing nodes.

8. The distributed conferencing system of claim 6, wherein, at each of said plurality of conferencing nodes, said processor causes said gain control module to apply a gain level that effectively mutes each of said number of local participant input signals that is not one of said number, N.

9. The distributed conferencing system of claim 8, wherein, at each of said plurality of conferencing nodes, said number of local participant input signals having their measured power communicated to all other of said plurality of conferencing nodes are a set of said number of local participant input signals having highest power levels.

10. The distributed conferencing system of claim 9, wherein said number, N, of the number of local participant input signals from said plurality of conferencing nodes having the highest power levels is set equal to the number of said plurality of remote participant input signals having their measured power communicated to all other of said plurality of conferencing nodes.

11. The distributed conferencing system of claim 4, wherein said multiplexer communicates said summed number of local participant input signals to all other of said plurality of conferencing nodes.

12. The distributed conferencing system of claim 11, wherein said processor determines a relative power level of each said summed number of local participant input signals communicated from said plurality of remote conferencing nodes.

13. The distributed conferencing system of claim 11, wherein said multiplexer converts said summed number of local participant input signals and said measured power levels for a plurality of said number of local participant input signals into a multiplexed node signal.

14. The distributed conferencing system of claim 13, wherein said demultiplexer receives and demultiplexes each of the multiplexed node signals generated by said plurality of remote conferencing nodes.

15. The distributed conferencing system of claim 14, wherein said system communications bus is a time-division multiplexing bus interconnecting said multiplexer and said demultiplexer of each of said plurality of conferencing nodes that conveys said multiplexed node signal generated by each of said plurality of conferencing nodes.

16. A method for transmitting communication signals in a telephony conferencing system, comprising:
    connecting a plurality of telephony conference nodes, comprising a local conference node and at least one remote conference node, to a system communication bus;
    connecting a plurality of local communication channels to said local conference node and a plurality of remote communication channels to said remote conference node;
    measuring power levels of local input signals received in the local conference node through the local communication channels;
    measuring power levels of remote input signals received in the remote conference node through the remote communication channels;
    selecting, in said local conference node, a set of the local input signals received in said local communication channels that are measured with highest power levels in said local conference node and transmitting said set of the local input signals and said highest power level measurements of said set of the local input signals to said remote conference node;
    determining, in said remote conference node, a set of remote input signals received in said remote communication channels having highest power levels in said remote node and transmitting said set of remote input signals and said highest power level measurements of said set of remote input signals to said local conference node;
    comparing, in each node, the measured power levels of the local input signals with the measured power levels of the remote input signals to determine the local input signals and the remote input signals with highest power levels;
    determining, in said local conference node and said remote conference node, an aggregate sum of said remote input signals and said local input signals having said highest power levels from said comparing; and
    transmitting said aggregate sum to each of said local communication channels and said remote communication channels as an output.

17. The method of claim 16, wherein each of said local communication channels and each of said remote communication channels outputs voice signals that are converted from said aggregate sum.

18. The method of claim 16, further comprising:
    if one of said local input signals is determined as having the highest power levels, applying a gain said one of said local input signals.

19. The method of claim 16, further comprising:
    muting said local input signals not within said aggregate sum of local input signals and of said remote input signals.

20. The method of claim 16, further comprising:
    providing a combiner in the local conference node for summing the local input signals into a summed local signal; and
    transmitting said summed local signal and the power level measurements of the local input signals to said remote conference node that is connected to said system communication bus.

* * * * *